(12) United States Patent
Randler et al.

(10) Patent No.: US 8,140,210 B2
(45) Date of Patent: Mar. 20, 2012

(54) METHOD AND DEVICE FOR OBJECT TRACKING IN A DRIVER ASSISTANCE SYSTEM OF A MOTOR VEHICLE

(75) Inventors: Martin Randler, Immenstaad (DE); Ruediger Jordan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 12/305,346

(22) PCT Filed: Oct. 9, 2007

(86) PCT No.: PCT/EP2007/060699
§ 371 (c)(1),
(2), (4) Date: May 7, 2009

(87) PCT Pub. No.: WO2008/068083
PCT Pub. Date: Jun. 12, 2008

(65) Prior Publication Data
US 2010/0017180 A1 Jan. 21, 2010

(30) Foreign Application Priority Data
Dec. 5, 2006 (DE) .................. 10 2006 057 276

(51) Int. Cl.
*G05D 1/00* (2006.01)
(52) U.S. Cl. .................... 701/27; 701/301
(58) Field of Classification Search ........ 701/1, 27, 701/301; 342/70–72; 706/48
See application file for complete search history.

(56) References Cited

U.S. PATENT DOCUMENTS

| | | | | |
|---|---|---|---|---|
| 6,567,737 B2 * | 5/2003 | Nakamura et al. | ............ | 701/96 |
| 6,753,804 B2 * | 6/2004 | Miyahara | ............ | 342/70 |
| 7,034,742 B2 * | 4/2006 | Cong et al. | ............ | 342/70 |
| 2002/0044081 A1 * | 4/2002 | Cong | ............ | 342/70 |
| 2003/0070851 A1 | 4/2003 | Winner et al. | | |
| 2005/0225477 A1 | 10/2005 | Cong et al. | | |
| 2006/0164218 A1 | 7/2006 | Kuttenberger et al. | | |
| 2007/0255672 A1 * | 11/2007 | Olsson | ............ | 706/56 |

FOREIGN PATENT DOCUMENTS

| | | |
|---|---|---|
| DE | 10 2004 039 741 | 2/2006 |
| DE | 10 2005 038 314 | 9/2006 |
| WO | WO 01/79882 | 10/2001 |
| WO | WO 2004/008174 | 1/2004 |

OTHER PUBLICATIONS

International Search Report, PCT/EP2007/060699 dated Feb. 4, 2008.

* cited by examiner

*Primary Examiner* — Paul N Dickson
*Assistant Examiner* — Timothy Wilhelm
(74) *Attorney, Agent, or Firm* — Kenyon & Kenyon LLP

(57) ABSTRACT

A method for predicting object movements in a driver assistance system of a motor vehicle, in which the movements of objects located periodically by a locating device (12) are precalculated by dynamic modeling of the objects, characterized in that a plurality of dynamic models (16) are held in readiness which are based on different hypotheses about the object, and that the models are selected and/or weighted as a function of the situation in accordance with the correctness probability (P1, P2) of the hypotheses for the prediction.

18 Claims, 4 Drawing Sheets

METHOD AND DEVICE FOR OBJECT TRACKING IN A DRIVER ASSISTANCE SYSTEM OF A MOTOR VEHICLE

FIELD OF THE INVENTION

The present invention relates to a method for predicting object movements in a driver assistance system of a motor vehicle, in which the movements of objects located periodically by a locating device are precalculated by dynamic modeling of the objects.

BACKGROUND INFORMATION

Driver assistance systems, e.g., what are referred to as ACC systems (adaptive cruise control), which permit automatic control of distance to a preceding vehicle, or safety systems (PSS; predictive safety systems) require constantly up-to-date information about objects in the surround field of the vehicle, particularly about the locations and movements of other road users. This information is usually obtained with the aid of a locating device, e.g., with the aid of a radar sensor having angular resolution, by which the distances, relative velocities and azimuth angles of preceding vehicles are able to be tracked. From the distances and azimuth angles, it is then possible to calculate the corresponding lateral positions of the objects, as well.

The radar sensor operates in periodically successive measuring cycles, so that the driver assistance system receives an up-to-date record of location data at regular intervals, e.g., at intervals of 1 ms. Tracking is understood to be a procedure by which the objects located in an instantaneous measuring cycle are identified with the objects located in previous cycles, so that the dynamic behavior of the objects may be monitored over time. Suitable algorithms are known for that purpose, which are executed in an electronic data-processing system belonging to the driver assistance system.

However, the tracking is rendered difficult because occasionally occurring interferences lead to individual location data being corrupted or missing completely. In order to be able to continue tracking the objects in such cases as well, and to obtain sufficiently reliable information about the objects, it is known to predict the movements of the objects with the aid of a dynamic model which is based on plausible assumptions about the movement of the object. With the help of this model, missing or corrupted data may then also be replaced by plausible estimated values. For example, the modeling is accomplished with the aid of predictive tracking filters such as Kalman filters, for instance.

Such predictive tracking is particularly important in determining the lateral offset (the y-position) of the located objects based on the measured azimuth angles. The measurement of this lateral offset is particularly susceptible to interference and errors, because the customary locating devices have only a limited angular-resolution capability, and in addition, the error tolerances increase proportionally to the object distance.

A simple dynamic model by which, in particular, the determination of the lateral offset of objects may be improved, is based, for instance, on the assumption that the lateral offset in a vehicle-fixed sensor coordinate system remains constant. However, in many situations, this hypothesis is not correct, so that faulty or inaccurate object estimations come about.

In addition, what is referred to as a parallel-driving model has already been proposed, which has proven to be suitable for ACC systems, in particular. This model is based on the hypothesis that all objects (all preceding vehicles) and the host vehicle are constantly moving on a parallel, straight or curved course. This hypothesis is at least approximately correct for most functions relevant for distance control.

However, there are also situations in which the parallel-driving hypothesis is inapplicable, for instance, when the driver of the host vehicle undertakes a lane change. For an ACC system in which the intention is to regulate the distance to a vehicle directly preceding in one's own lane, this case is not relevant so long as the host vehicle remains in its lane. However, the situation is different in PSS systems, for example, in which, in the case of an immediately imminent crash, emergency measures are initiated automatically for preventing the crash, for instance, by a full brake application, or for mitigating the accident consequences. In assistance systems of this kind, a faulty or inaccurate object estimation as a result of incorrect model hypotheses may lead to unwanted erroneous activations.

SUMMARY

Example embodiments of the present invention improve the accuracy and reliability of the prediction of object movements.

This is achieved according to example embodiments of the present invention, by holding a plurality of dynamic models in readiness which are based on different hypotheses about the object, and by selecting and/or weighting the models as a function of the situation in accordance with the probability the hypothesis for the prediction is correct.

In this method, the dynamic modeling of the objects is therefore based on different hypotheses, depending on the traffic situation, and in each case, that model is selected or at least more strongly weighted for which there is the greatest probability to believe that the underlying hypothesis is satisfied in this specific situation. Thus, in the simplest case, a switch is made between various models depending on the traffic situation. More generally, however, a plurality of models may also be incorporated simultaneously with different weighting in the tracking procedure, and in this case, the weightings are shifted according to the probability of the hypotheses being correct. In this manner, it is possible for the model selection to agree better with the actual circumstances in a large range of traffic situations, and therefore the accuracy and reliability of the object estimation are improved.

In an example embodiment, particularly for determining the lateral offset of objects, one of the models held in readiness is the parallel-driving model mentioned above, and what is called a straight-ahead-driving model is kept ready as a further model. This model is based on the hypothesis that the object in question is maintaining its instantaneous absolute velocity constant in amount and direction. Although this hypothesis is often only approximately satisfied in practice, this model is superior to the parallel-driving model primarily when the driver of the host vehicle undertakes a lane change or other abrupt steering maneuver, so that his/her course deviates markedly from the course of the remaining vehicles.

For the decision as to which model is more appropriate in the current situation, as a rule, one resorts not only to the data of the locating device, but also to the data of an additional sensor suite. For example, one relevant and suitable criterion for deciding between the parallel-driving model and the straight-ahead-driving model is the yawing motion of the host vehicle, which may be measured with the aid of a yaw-rate sensor or lateral-acceleration sensor. From the data of such a sensor, in particular, it is possible to calculate the lateral jolt, that is, the change in lateral acceleration or centripetal acceleration of the host vehicle. The parallel-driving model is appropriate especially when the host vehicle and the preceding vehicle are traveling through a curve with a constant curvature, without the driver of the host vehicle undertaking a lane change. In this situation, the lateral acceleration is nearly constant, and the lateral jolt is correspondingly low. In addition, it must be expected that the lateral acceleration will constantly lie approximately on the same order of magnitude regardless of the radius of curve, because generally the driver will adjust his/her speed to the roadway curvature in such a way that the lateral acceleration remains within comfortable limits. If the lateral acceleration lies within this magnitude range and/or is nearly constant, a high correctness probability therefore speaks for the parallel-driving hypothesis. In the case of a greater lateral jolt, on the other hand, it can more likely be assumed that the driver of the host vehicle is performing an evasive maneuver or lane change, and in this case, the straight-ahead-driving model is more appropriate. Alternatively, a lane change by the host vehicle may also be recognized based on a characteristic signature of the yaw-rate signal, as described, for example, in DE 10 2004 039 741.

In an example embodiment of the method, based on the signal or the signals of the sensor suite, e.g., based on the yaw-rate signal, initially a correctness probability is calculated for each of the hypotheses underlying one of the models available, the correctness probability then forming the basis for the selection or weighting of the models. It is particularly expedient to estimate the correctness probabilities with the aid of a Markov chain.

For the predictive tracking, preferably the various models are then combined or merged together by weighting the model parameters in accordance with the correctness probabilities of the hypotheses. For example, if the tracking is accomplished by Kalman filtering, then the control vector and possibly also the control matrix as well as the increment of the system variance are varied in accordance with the correctness probabilities.

An exemplary embodiment of the present invention is illustrated in the drawing and explained in greater detail in the following description.

DETAILED DESCRIPTION

Figure 1:
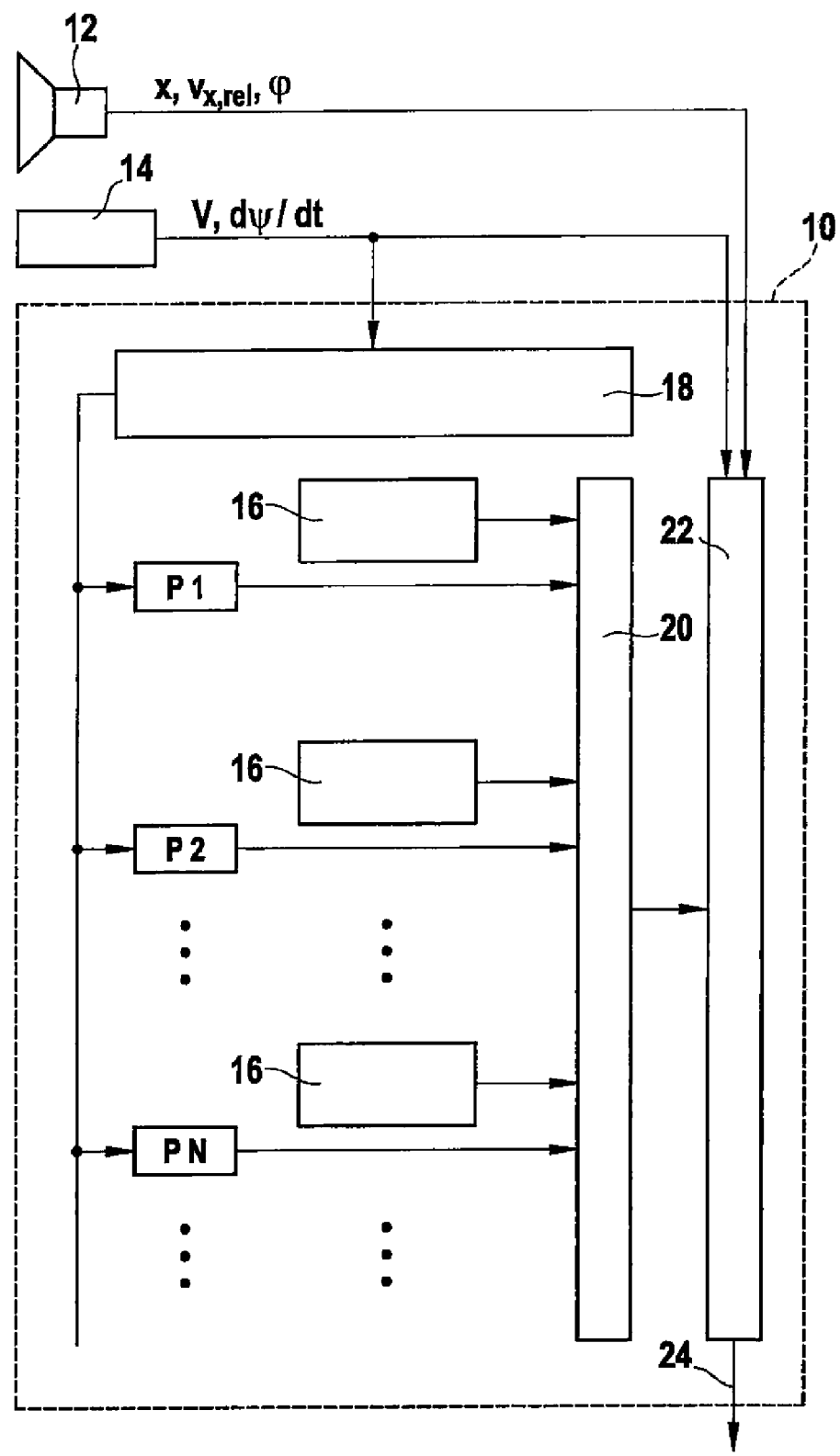
FIG. 1 is a block diagram of a device according to example embodiments of the present invention.

FIG. 1 shows, as a block diagram, a prediction module 10 which is implemented as software and/or hardware in an electronic data-processing system of a driver assistance system, for instance, a PSS system, and receives data from a locating device 12, as well as from an additional sensor suite 14. In the example shown, locating device 12 is a radar sensor having angular resolution with which, for each located object, distance x (approximately in the direction of the instantaneous longitudinal axis of the host vehicle), relative velocity $v_{x,rel}$ of the object, as well as azimuth angle $\phi$ of the object are measured. From distance x and azimuth angle $\phi$, lateral offset y of the object may then be calculated in prediction module 10, or optionally also in an upstream processing stage.

In the example shown, sensor suite 14 includes a velocity sensor for measuring velocity V of the host vehicle equipped with the driver assistance system, as well as a yaw-rate sensor by which yaw rate $d\psi/dt$ of this vehicle is measured.

Various dynamic models 16 are stored in prediction module 10, which are used to model the dynamic behavior of a located object and to predict the future behavior, and which in each case are based on a specific hypothesis about the anticipated dynamic behavior of the object. In principle, the number of models 16 held in readiness is unlimited. However, hereinafter only two models, model 1 and model 2, shall be considered in explaining the tracking method, underlying which as hypothesis in the case of model 1 is a parallel-driving hypothesis, and in the case of model 2 is a straight-ahead-driving hypothesis.

Based on the data from sensor suite 14, initially a correctness probability P1, P2, . . . , PN, . . . , is calculated or estimated for each of these hypotheses in a block 18. This calculation is based on a Markov chain, as shall be explained in greater detail later.

In a fusion module 20, various models 16 are then combined to form one uniform model, and in so doing, are weighted in accordance with the correctness probabilities of the hypotheses. The model parameters thus obtained are then used in a filter module 22, in the example shown, a Kalman filter, for the actual predictive object tracking. The result of the tracking procedure is ultimately transferred at an output 24 to downstream components of the driver assistance system.

Locating device 12 operates periodically, and therefore supplies an up-to-date record of location data for each object in each measuring cycle. The correctness probabilities are also calculated periodically in block 18 based on the data from sensor suite 14, preferably synchronously with the operating cycle of locating device 12.

Figure 2:
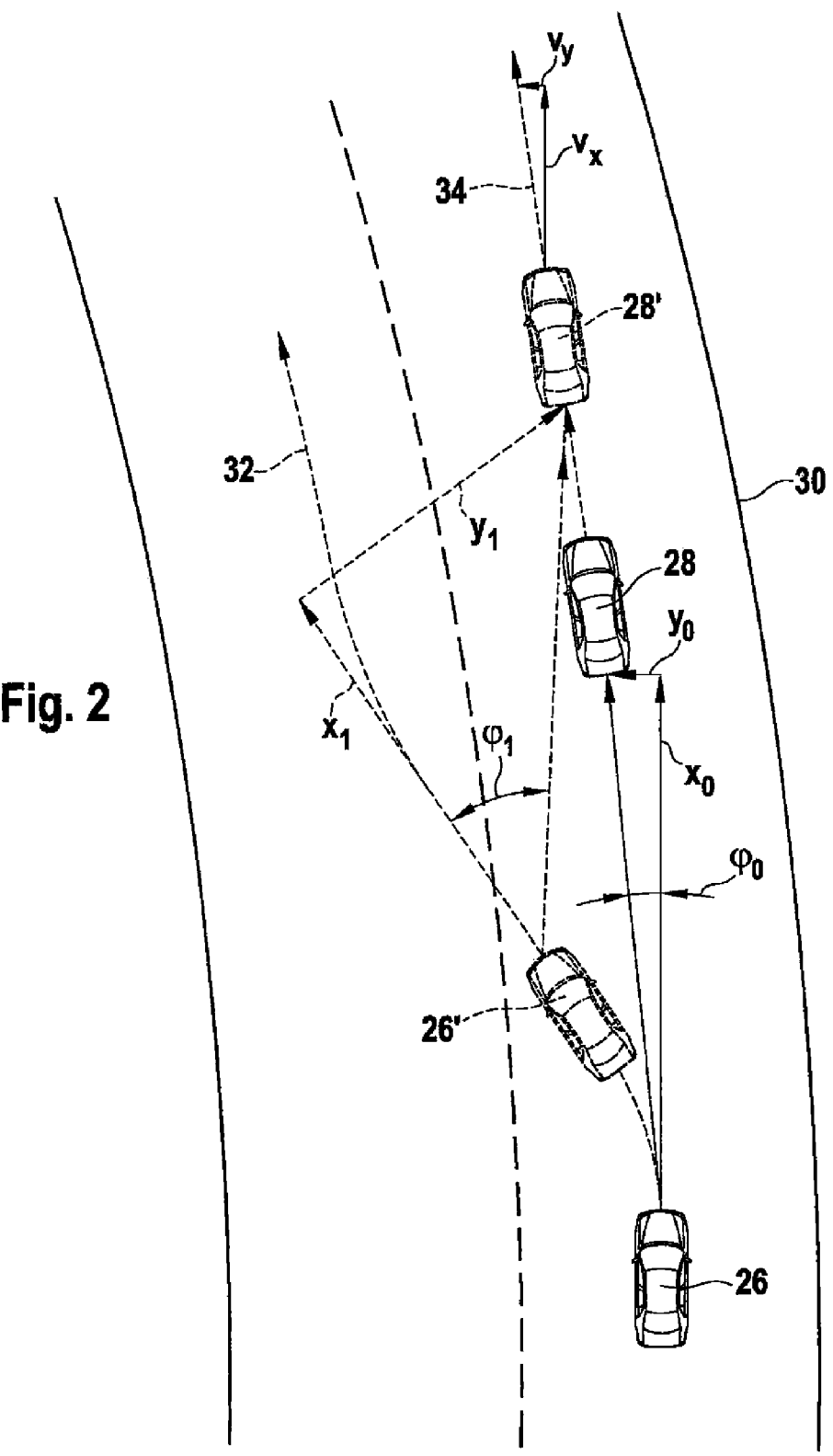
FIG. 2 is a sketch of a traffic situation to clarify a straight-ahead-driving model.

FIG. 2 illustrates a traffic situation in which a vehicle 26, hereinafter called the "host vehicle", equipped with the driver assistance system and prediction module 10 according to FIG. 1, as well as an object 28, here a preceding vehicle, are traveling on a roadway 30 having a nearly constant curvature. However, host vehicle 26 is not following the roadway profile, but rather is changing lanes, as symbolized by a curved arrow 32 which indicates the anticipated course of this vehicle. In this situation, model 2 according to FIG. 1, which is based on the straight-ahead-driving hypothesis for object 28, is utilized for estimating the object movements with the aid of prediction module 10. This hypothesis specifies that object 28 will maintain its current absolute velocity as to quantity and direction. Accordingly, the anticipated course of object 28 is indicated by a straight arrow 34, and the velocity vector (absolute velocity) of this object is constant and has the components $v_x$ and $v_y$.

At the instantaneous moment, distance $x_0$ and azimuth angle $\phi_0$ are measured for object 28. Strictly speaking, distance $x_0$ is not measured in the direction of the longitudinal axis of the host vehicle, as shown in FIG. 2, but rather along the "line of sight" from vehicle 26 to object 28. However, the difference between these distances is negligible. Lateral offset $y_0$ of object 28 is obtained from distance $x_0$ and azimuth angle $\phi_0$.

After a certain time interval $\Delta t$, which corresponds to the cycle time of locating device 12, host vehicle 26 has reached position 26' marked with a dashed line and, according to the straight-ahead-driving hypothesis, object 28 has reached position 28'.

Prediction module 10 now has the task of predicting new position 28' of object 28 and, in particular, its new lateral offset $y_1$. The data thus predicted is then compared to the location data arriving in the new measuring cycle, so that upon suitable agreement, the object at position 28' located in the new cycle may be identified with object 28 previously located. The data for position 28' then forms the basis for a new prediction for the next measuring cycle. If, because of an interference, position 28' cannot be located directly with the aid of locating device 12, instead of the measured location data, it is necessary to work solely with the predicted data. If, because of the interference, the measurement data is actually available but is corrupted, a plausible estimated value for the position of the object must be formed from the corrupted measurement data and the predicted data.

In predicting position 28', it is necessary to take the movement of host vehicle 26 into account, as well. While, given a sufficiently small cycle time, the change in location of vehicle 26 is relatively small, a slight change in direction of vehicle 26 can already lead to a considerable change in the lateral offset of the object, particularly if the object distance is great. This can be seen clearly in FIG. 2 if one compares lateral offset $y_0$ of object 28 at the starting moment to lateral offset $y_1$ of position 28' in the next measuring cycle.

The lateral offset is predicted in filter module 22 according to the following differential equation for a discrete Kalman filter:

$$\begin{pmatrix} y_{k+1} \\ v_{y,k+1} \end{pmatrix} = A \cdot \begin{pmatrix} y \\ v_{y,k} \end{pmatrix} + kB \cdot u_k \quad (1)$$

In this respect, $Y_{k+1}$ is the lateral offset of the object in cycle k†+†1, and $v_{y,k+1}$ is the lateral velocity of the object in cycle k+1. Accordingly, $y_k$ and $v_{y,k}$ are the lateral offset and the lateral velocity in previous cycle k. Matrix A describes the movement behavior of object 28, as expected according to the underlying model. In accordance with the straight-ahead-driving hypothesis, matrix A here has the form:

$$A = \begin{pmatrix} 1 & \Delta t \\ 0 & 1 \end{pmatrix} \quad (2)$$

Vector $u_k$ is a control vector, which here does not describe any actual movement of object 28, but rather a set of control variables which describe the influence of the movement of host vehicle 26 during time $\Delta t$. Matrix B is a control matrix which indicates how control vector $u_k$ affects the prediction for next cycle k+1. In the example considered here, the differential equation is of first order in cycle duration $\Delta t$. Terms of the order $(\Delta t)^2$, like perhaps the change in the y-coordinate of host vehicle 26 during time $\Delta t$, therefore remain unconsidered. Vector $u_k$ then has the form:

$$u_k = \begin{pmatrix} 0 \\ \Delta v_{y,rel,k} \end{pmatrix} \quad (3)$$

The second component $\Delta v_{y,rel,k}$ of this vector the change in the y-component of the relative velocity of the object during last interval $\Delta t$. Matrix B has the form:

$$B = \begin{pmatrix} 0 & \Delta t/2 \\ 0 & 1 \end{pmatrix} \quad (4)$$

Product $B \cdot u_k$ then has the components:

$$B \cdot u_k = \begin{pmatrix} \Delta t \cdot \Delta v_{y,rel,k}/2 \\ \Delta v_{y,rel,k} \end{pmatrix} \quad (5)$$

and therefore describes the apparent change in the lateral offset of the object and the apparent change in the lateral velocity based on the rotation of host vehicle 26.

Figure 3:
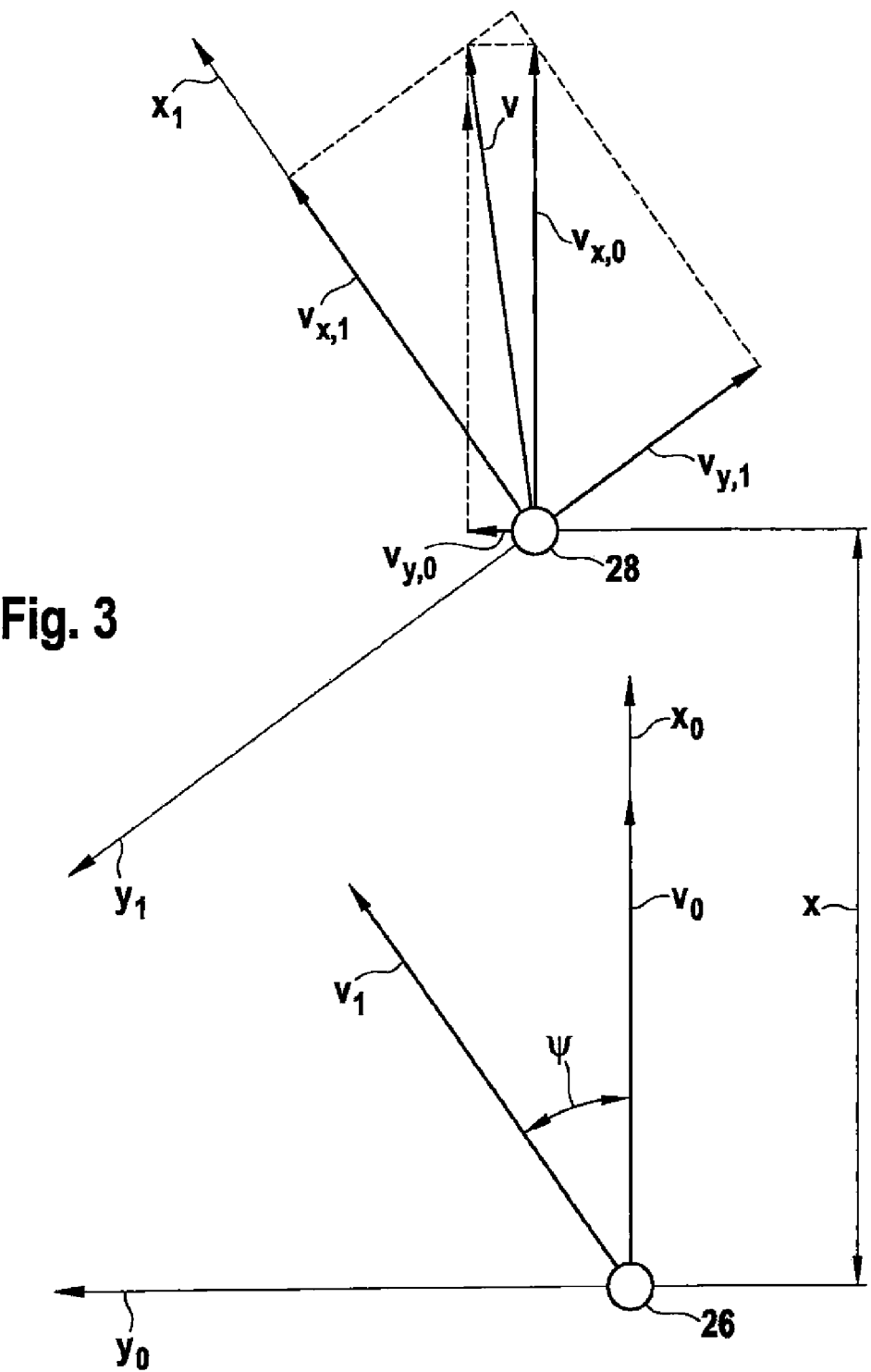
FIG. 3 is a diagram to more precisely clarify the straight-ahead-driving model.

The derivation of quantity $\Delta v_{y,rel,k}$ shall be clarified with reference to FIG. 3, without explicitly explaining the calculations based on simple trigonometric considerations. Host vehicle 26 and object 28 are represented in simplified fashion as points in FIG. 3. In this diagram, only the changes in the absolute velocity vectors are considered, and the changes in location of the vehicle and of the object are not shown. In cycle k=0, host vehicle 26 has velocity vector $V_0$, which at the same time defines the $X_0$-axis of an absolute $X_0$-$Y_0$-coordinate system. Object 28 has constant velocity vector v in this cycle as well as in the following cycle k=1. This vector has components $v_{x,0}$ and $v_{y,0}$ in the $X_0$-$Y_0$-coordinate system.

In the next cycle k=1, host vehicle 26 has velocity vector $V_1$, which then defines a new coordinate system with axes $X_1$ and $Y_1$. In this $X_1$-$Y_1$-coordinate system, velocity vector v of object 28 has components $v_{x,1}$ and $v_{y,1}$.

The quantity $\Delta v_{y,rel,k}$ sought indicates for k=1 the change in the y-component of the velocity of object 28 relative to vehicle 26 from cycle k=0 to cycle k†=1. In order to calculate this quantity, initially $v_{y,1}$ must be expressed by components $v_{x,0}$ and $v_{y,0}$ in the $X_0$-$Y_0$-coordinate system. The two coordinate systems are rotated relative to each other by angle ψ, by which the direction of vehicle 26 has changed. Thus, ψ is the product of the yaw rate, measured by sensor suite 14, and time interval $\Delta t$. The components of v are then converted into relative components, specific to moving vehicle 26, and finally, the difference is formed between the relative velocities from the instantaneous and the previous cycle. Difference $\Delta v_{y,rel,k}$ thus obtained is a function of measured object distances x in cycle k=0 and in cycle k=1, quantities dψ/dt and V measured by sensor suite 14, as well as time interval $\Delta t$. Thus, all quantities for calculating control vector $u_k$ are known.

Figure 4:
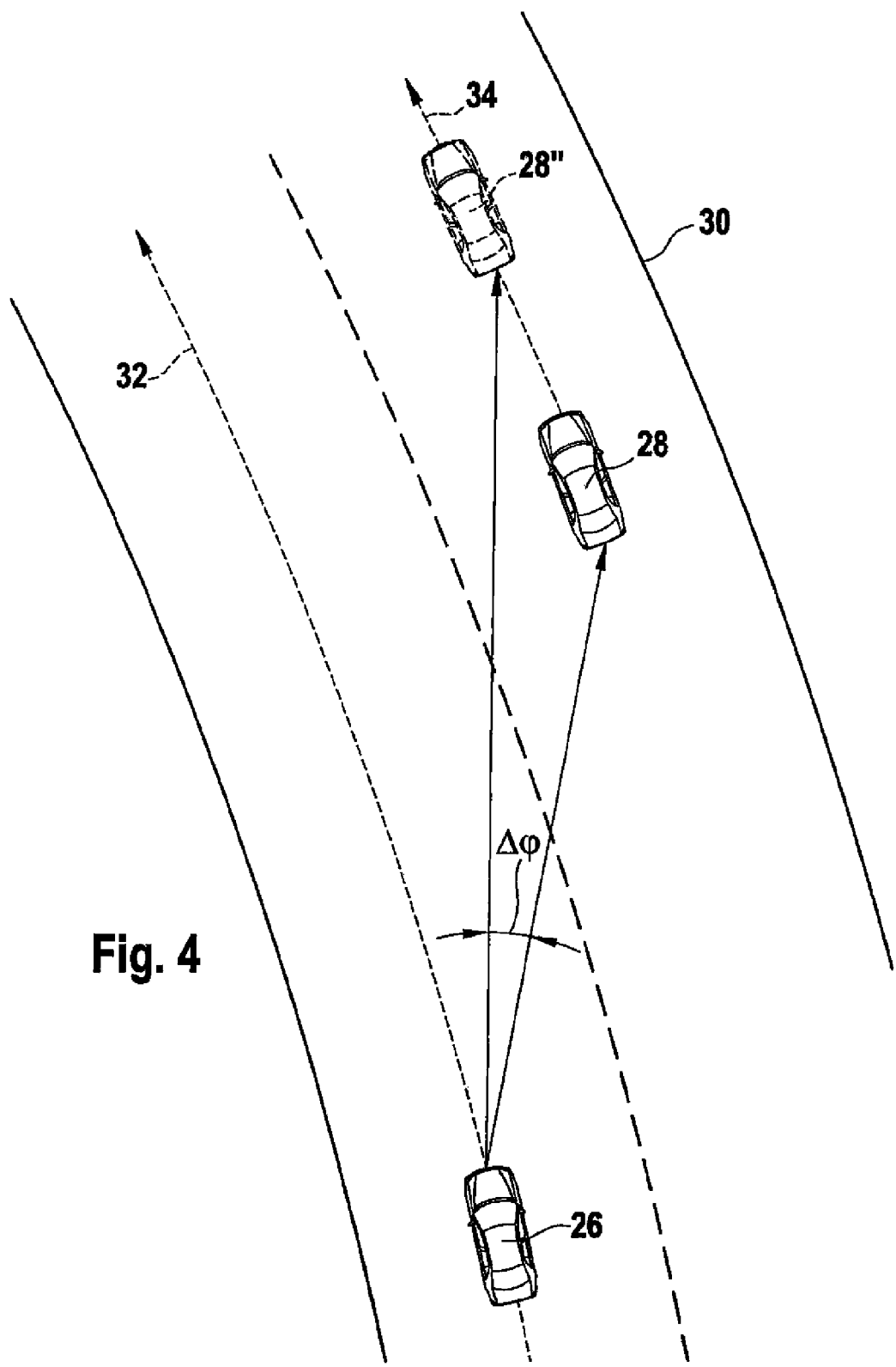
FIG. 4 is a sketch of a traffic situation to clarify a parallel-driving model.

FIG. 4 illustrates a situation in which host vehicle 26 remains in its lane on curved roadway 30, and therefore is in a constant cornering with nearly constant yaw rate. Object 28 is also following the profile of roadway 30. In this case, therefore, the parallel-driving hypothesis, which underlies model 1 in FIG. 1, is appropriate. Arrows 32 and 34 again represent the anticipated courses of vehicle 26 and object 28.

When vehicle 26 and object 28 travel with the same velocity taken absolutely, then the spatial relationship between them does not change, and both rotate jointly about the center of curvature of roadway 30. Consequently, in this special case, the lateral offset of object 28 remains unchanged.

However, a change in the lateral offset comes about when object 28 travels with a velocity different from the velocity of vehicle 26, thus has a non-vanishing relative velocity. Here, position 28" marked in with a dashed line is the position which indicates the change in location of object 28 relative to vehicle 26 during time $\Delta t$. According to the parallel-driving hypothesis, not only does vehicle 26 execute its own rotation with yaw rate dΨ/dt, but object 28 and its velocity vector are also rotated, in general, at non-vanishing relative velocity, but with a different yaw rate. The relative rotation of the coordinate systems, which was indicated in FIG. 3 by angle Ψ, must therefore be replaced by the rotation of the coordinate systems of vehicle 26 and of object 28 relative to each other. For this hypothesis, as well, a control vector $u_k$ may be indicated, which has the same form as in the case of the straight-ahead-driving hypothesis, namely:

$$u_k \atop \Delta v_{y,rel,k} = 0 \quad (6)$$

now, however, quantity $\Delta v_{y,rel,k}$ being a function of the difference in yaw rate between vehicle 26 and object 28. However, this yaw-rate difference may also be determined from the yaw rate of host vehicle 26 and the measured relative velocity of object 28.

Matrix B also has the same form as in the straight-ahead-driving model, and matrix A still has the same form as in equation (2) as well, for since only terms of first order are taken into account in $\Delta t$, the curvature of the course of object 28 is not reflected in matrix A.

Therefore, for both models, a differential equation may be set up with the form indicated in (1), which may then be used according to the theory of the Kalman filter to predict the movement of object 28 from measuring cycle to measuring cycle, in each case taking into account the data actually measured by locating device 12, in such a way that, considering the previous history and the measured values, the prediction corresponds with the greatest probability to the actual position of the object. In so doing, in a cyclical change between prediction and comparison to the actual data, not only the prediction values, but also the associated error variances are updated, which are needed to update the estimated values with the aid of what is referred to as the Kalman gain.

In the following, it shall now be explained how correctness probabilities P1 and P2 are calculated based on the measured yaw rate and velocity V of host vehicle 26, and how the two models are merged based on these probabilities.

The calculation of the correctness probabilities is based on a Markov chain having the two states:
1. constant cornering
2. non-constant cornering.

For the transition probabilities from one state to the other, a transition matrix M is defined having matrix elements $p_{ij}$ which were ascertained empirically in advance. For example, a suitable transition matrix is $$M = \begin{matrix} p_{11} & p_{12} \\ p_{21} & p_{22} \end{matrix} = \begin{matrix} 0.9 & 0.1 \\ 0.02 & 0.98 \end{matrix} \quad (2)$$

In this respect, $p_{ij}$ denotes the probability that the system also changes from state i state j. Probabilities P1 and P2 are then recalculated cyclically in the Markov process, in each case with reference to the instantaneous sensor data. If $P1_{(k-1)}$ and $P2_{(k-1)}$ are the a-posteriori probabilities for state 1 and state 2, respectively, that is, the probabilities taking into account the measurement data received most recently in cycle k−1, then for the next updating step, a-priori probabilities $C_1$, $C_2$, (without taking into account the newest measurement data) may be indicated as follows:

$$C = M^T P_{(k-1)},$$

where C is the vector having components ($C_1$, $C_2$) and P is the vector having components ($P_1$, $P_2$), thus:

$$C1 = 0.9 P1_{(k-1)} + 0.02 P2_{(k-1)} \text{ and}$$

$$C2 = 0.1 P1_{(k-1)} + 0.98 P2_{(k-1)}.$$

The new a-posteriori probabilities $P1_{(k)}$ and $P2_{(k)}$ are then given by:

$$P1_{(k)} = q_1 C_1 / (q_1 C_1 + q_2 C_2)$$

and $$P2_{(k)} = q_2 C_2 / (q_1 C_1 + q_2 C_2).$$

In this respect, $q_1$ and $q_2$ are probability densities which, according to a certain probability distribution, are a function of the measured values. From the measured values for V and $d\psi/dt$ obtained in successive measuring cycles, first of all "lateral jolt" J is calculated:

$$J = \Delta(d\psi/dt) * V/\Delta t.$$

In this respect, $\Delta(d\psi/dt)$ is the difference between the yaw rates measured in the two last cycles. Lateral jolt J therefore indicates the change in the lateral acceleration per time interval $\Delta t$. For constant cornering, a normal distribution as a function of this lateral jolt J is assumed:

$$q_1 = (2\pi\sigma^2)^{-1/2} * \exp(-J^2/2\sigma^2),$$

with a standard deviation $\sigma$ of, for instance, 0.5 m/s$^3$ specified as system parameter. This is based on the consideration that the smaller the lateral jolt, the more probable the cornering is constant.

For the hypothesis that cornering is not constant, a uniform distribution is assumed as probability distribution for probability density $q_2$:

$$q_2 = (J_{max} - J_{min})^{-1},$$

where $J_{min}$ and $J_{max}$ are the upper and lower limits of the value range in question for J. This uniform distribution represents the ignorance about what lateral jolt will occur in the case of non-constant cornering. Suitable values for $J_{min}$ and $J_{max}$ are, for example, $\pm 10$ ms$^{-3}$ and therefore $q_2 = 0.05$ m$^{-1}$ s$^3$.

In this manner, in each cycle a new estimation of the correctness probabilities is obtained, which appropriately takes into account the (probable) previous state and the transition probabilities, as well as the newest measured values.

With the aid of these correctness probabilities, models 1 and 2 may be combined as follows. As was explained with reference to FIGS. 2 through 4, models 1 and 2 differ in control vector u. For model 1, one has control vector $u_{parallel}$, which is a function of the difference between the yaw velocities of host vehicle 26 and of object 28, and for model 2, one has control vector $u_{straight}$, which is a function of the yaw rate of the host vehicle. In the fusion module, these two control vectors are now combined according to the following formula to form a new control vector:

$$u = P1 u_{parallel} + P2 u_{straight} (P1 + P2 = 1)$$

The control vectors are therefore weighted in accordance with the correctness probabilities.

As mentioned above, in the Kalman filter cycle, variance matrix Q must be predicted and updated, as well. Upon the fusion of the two models, provided P1 or P2 is not equal to 1, for this variance matrix one obtains an additional increment $\Delta Q$, which is defined as follows:

$$\Delta Q = P1 * P2 * B \cdot (u_{parallel} - u_{straight}) * (u_{parallel} - u_{straight})^T \cdot B^T.$$

These rules for the model fusion may be generalized analogously to the fusion of three or more models.

What is claimed is:
1. A method for predicting object movements in a driver assistance system of a motor vehicle, comprising:

precalculating movements of objects located periodically by a locating device by dynamic modeling of the objects;

holding a plurality of dynamic models in readiness based on different hypotheses about the object; and at least one of (a) selecting and (b) weighting the models as a function of a situation in accordance with a correctness probability of the hypotheses for the prediction;

wherein the correctness probabilities are calculated with the aid of a Markov chain;

wherein for a calculation of a a-posteriori probability for a parallel-driving model, a starting assumption is a normally distributed probability density as a function of a change in a lateral acceleration, and for a a-posteriori probability for a straight-ahead-driving model, a starting assumption is a constant probability density.

2. The method according to claim 1, wherein one of the models is the parallel-driving model, which is based on the hypothesis that a host vehicle and the object are moving on parallel courses.

3. The method according to claim 1, wherein one of the models is the straight-ahead-driving model, which is based on the hypothesis that the object is moving with constant velocity in unvarying direction.

4. The method according to claim 1, wherein for each model, based on data about dynamics of a host vehicle, which is provided by a sensor suite, a corresponding correctness probability is calculated, and the models for the prediction are combined, and in so doing, are weighted in accordance with the correctness probabilities.

5. The method according to claim 1, wherein a correctness probability for the parallel-driving model indicates a probability that a host vehicle is in a constant cornering in which, at most, small changes occur in a lateral acceleration of the vehicle, and a correctness probability for the straight-ahead-driving model indicates a probability that the host vehicle is not in a constant cornering.

6. The method according to claim 1, wherein the prediction is accomplished by Kalman filtering.

7. A system, comprising:
a device adapted to predicting object movements in a driver assistance system of a motor vehicle, by performing the following:
precalculating movements of objects located periodically by a locating device by dynamic modeling of the objects;
holding a plurality of dynamic models in readiness based on different hypotheses about the object; and
at least one of (a) selecting and (b) weighting the models as a function of a situation in accordance with a correctness probability of the hypotheses for the prediction;
wherein the correctness probabilities are calculated with the aid of a Markov chain;
wherein for a calculation of a a-posteriori probability for a parallel-driving model, a starting assumption is a normally distributed probability density as a function of a change in a lateral acceleration, and for a a-posteriori probability for a straight-ahead-driving model, a starting assumption is a constant probability density.

8. The device according to claim 7, wherein one of the models is the parallel-driving model, which is based on the hypothesis that a host vehicle and the object are moving on parallel courses.

9. The device according to claim 7, wherein one of the models is the straight-ahead-driving model, which is based on the hypothesis that the object is moving with constant velocity in unvarying direction.

10. The device according to claim 7, wherein for each model, based on data about dynamics of a host vehicle, which is provided by a sensor suite, a corresponding correctness probability is calculated, and the models for the prediction are combined, and in so doing, are weighted in accordance with the correctness probabilities.

11. The device according to claim 7, wherein a correctness probability for the parallel-driving model indicates a probability that a host vehicle is in a constant cornering in which, at most, small changes occur in a lateral acceleration of the vehicle, and a correctness probability for the straight-ahead-driving model indicates a probability that the host vehicle is not in a constant cornering.

12. The device according to claim 7, wherein the prediction is accomplished by Kalman filtering.

13. A computer readable medium having a computer program, which is executable by a processor, comprising:
A program code arrangement having program code for predicting object movements in a driver assistance system of a motor vehicle, by performing the following:
precalculating movements of objects located periodically by a locating device by dynamic modeling of the objects;
holding a plurality of dynamic models in readiness based on different hypotheses about the object; and
at least one of (a) selecting and (b) weighting the models as a function of a situation in accordance with a correctness probability of the hypotheses for the prediction;
wherein the correctness probabilities are calculated with the aid of a Markov chain;
wherein for a calculation of a a-posteriori probability for a parallel-driving model, a starting assumption is a normally distributed probability density as a function of a change in a lateral acceleration, and for a a-posteriori probability for a straight-ahead-driving model, a starting assumption is a constant probability density.

14. The computer readable medium according to claim 13, wherein one of the models is the parallel-driving model, which is based on the hypothesis that a host vehicle and the object are moving on parallel courses.

15. The computer readable medium according to claim 13, wherein one of the models is the straight-ahead-driving model, which is based on the hypothesis that the object is moving with constant velocity in unvarying direction.

16. The computer readable medium according to claim 13, wherein for each model, based on data about dynamics of a host vehicle, which is provided by a sensor suite, a corresponding correctness probability is calculated, and the models for the prediction are combined, and in so doing, are weighted in accordance with the correctness probabilities.

17. The computer readable medium according to claim 13, wherein a correctness probability for the parallel-driving model indicates a probability that a host vehicle is in a constant cornering in which, at most, small changes occur in a lateral acceleration of the vehicle, and a correctness probability for the straight-ahead-driving model indicates a probability that the host vehicle is not in a constant cornering.

18. The computer readable medium according to claim 13, wherein the prediction is accomplished by Kalman filtering.

\* \* \* \* \*